(12) United States Patent
Heo et al.

(10) Patent No.: US 8,744,837 B2
(45) Date of Patent: Jun. 3, 2014

(54) QUESTION TYPE AND DOMAIN IDENTIFYING APPARATUS AND METHOD

(75) Inventors: Jeong Heo, Daejeon (KR); Myung Gil Jang, Daejeon (KR); Hyunki Kim, Daejeon (KR); Pum Mo Ryu, Daejeon (KR); Changki Lee, Daejeon (KR); Chung Hee Lee, Daejeon (KR); Ji Ae Shin, Daejeon (KR); Yoonjae Choi, Daejeon (KR); Soojong Lim, Daejeon (KR); Miran Choi, Daejeon (KR); Yeo Chan Yoon, Daejeon (KR); Hyo-Jung Oh, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 222 days.

(21) Appl. No.: 13/281,368

(22) Filed: Oct. 25, 2011

(65) Prior Publication Data
US 2012/0101807 A1    Apr. 26, 2012

(30) Foreign Application Priority Data
Oct. 25, 2010    (KR) ........................ 10-2010-0104145

(51) Int. Cl.
*G06F 17/27* (2006.01)
*G06F 7/00* (2006.01)
*G06F 17/30* (2006.01)

(52) U.S. Cl.
USPC ............................... 704/9; 707/706; 707/722

(58) Field of Classification Search
USPC .......................................................... 704/9
See application file for complete search history.

(56) References Cited

U.S. PATENT DOCUMENTS

| | | | |
|---|---|---|---|
| 5,799,268 A * | 8/1998 | Boguraev | 704/9 |
| 7,418,443 B2 * | 8/2008 | Yoshimura et al. | 1/1 |
| 7,587,389 B2 * | 9/2009 | Sugihara et al. | 1/1 |
| 7,657,424 B2 * | 2/2010 | Bennett | 704/9 |
| 8,380,505 B2 * | 2/2013 | Konig et al. | 704/251 |
| 8,452,747 B2 * | 5/2013 | Narayanan et al. | 707/706 |
| 8,468,143 B1 * | 6/2013 | Oztekin et al. | 707/706 |
| 2002/0188586 A1 * | 12/2002 | Veale | 707/1 |
| 2003/0101153 A1 * | 5/2003 | Francis et al. | 706/47 |
| 2004/0073548 A1 * | 4/2004 | Lim et al. | 707/5 |
| 2005/0060290 A1 * | 3/2005 | Herscovici et al. | 707/3 |
| 2005/0086222 A1 * | 4/2005 | Wang et al. | 707/5 |
| 2005/0283474 A1 * | 12/2005 | Francis et al. | 707/5 |
| 2006/0136208 A1 * | 6/2006 | Chung et al. | 704/251 |

(Continued)

FOREIGN PATENT DOCUMENTS

KR    1020010107111 B1 *   12/2001
KR    2002-0027088 A        4/2002

(Continued)

*Primary Examiner* — Richemond Dorvil
*Assistant Examiner* — Olujimi Adesanya
(74) *Attorney, Agent, or Firm* — Rabin & Berdo, P.C.

(57) ABSTRACT

A question type and domain identifying apparatus includes: a question type identifier for recognizing the number of words of a user's question to identify whether the user's question is a query for performing information searching or a question for performing a question and answer (Q&A); a question domain distributor for distributing one of plural preset domain specialized Q&A engines, as a Q&A engine of the user's question based on the recognized word number; and a Q&A engine block, including the domain specialized Q&A engines, for selectively performing information searching or a Q&A with respect to the user's question in response to the distribution of the question domain distributor.

18 Claims, 5 Drawing Sheets

(56) References Cited

U.S. PATENT DOCUMENTS

| | | | |
|---|---|---|---|
| 2007/0067293 A1* | 3/2007 | Yu ..................................... | 707/7 |
| 2007/0076547 A1* | 4/2007 | Rahman et al. ............ | 369/47.15 |
| 2007/0100814 A1* | 5/2007 | Lee et al. ......................... | 707/5 |
| 2007/0192085 A1* | 8/2007 | Roulland et al. .................. | 704/9 |
| 2008/0288454 A1 | 11/2008 | Swadi | |
| 2009/0182731 A1* | 7/2009 | Zhang .............................. | 707/5 |
| 2010/0153094 A1* | 6/2010 | Lee et al. .......................... | 704/9 |
| 2010/0235311 A1* | 9/2010 | Cao et al. ......................... | 706/46 |
| 2012/0077178 A1* | 3/2012 | Bagchi et al. ................. | 434/362 |

FOREIGN PATENT DOCUMENTS

| | | |
|---|---|---|
| KR | 10-0479346 | 3/2005 |
| KR | 2006-0067129 A | 6/2006 |
| KR | 2008-0025824 A | 3/2008 |
| KR | 2010-0067175 A | 6/2010 |

\* cited by examiner

QUESTION TYPE AND DOMAIN IDENTIFYING APPARATUS AND METHOD

CROSS-REFERENCE(S) TO RELATED APPLICATION(S)

The present invention claims priority of Korean Patent Application No. 10-2010-0104145, filed on Oct. 25, 2010, which is incorporated herein by reference.

FIELD OF THE INVENTION

The present invention relates to a technique for identifying a question type and domain for information searching and question answering for an open web, and more particularly, to a question type and domain identifying apparatus and method for classifying a user's question into a question appropriate for a question and answer and a query appropriate for information searching to identify the user's question, distributing the user's question to question and answer engines of respective domains, and restricting a search target document with a question subject (or question theme) and area information, so as to effectively find an answer to the user's question.

BACKGROUND OF THE INVENTION

Recently, various types of digital contents have been produced and distributed exponentially with the advancement of web and Internet techniques. Such a change in the environment is creating a huge demand for web searching, and the rapid growth of a global search company such as Google for example is considered to result from properly satisfying search demand for users' web contents in line with the changed environment.

As-well known in the art, a question and answer technique for web searching is a technique in which when a user inputs required information in form of a question in a natural language, a system searches for an answer to the user's question from a document and presents it. This question and answer technique is an application technique that comprehensively employs a natural language processing technique, an information extraction technique, and the like, and it is studied for limited domains and documents due to its level of difficulty. Namely, the conventional method uses a scheme of processing a question for a limited domain with a limited answer type and extracting an answer thereto.

In this regard, various technical developments related to such question and answer were made as text retrieval conference (TREC) established in 1992 created a question and answer track in the late 1990s, but it was mostly limited to Factoid questions and some descriptive questions for limited domains due to a technical limitation. And, in the late 2000s, a technical advancement has been achieved to process even a comprehensive question and answer type for an open domain in the question and answer technique in line with the development of a language processing technique, an information extraction technique, a meaning analysis technique, and the like.

As described above, over the flood of web contents and information growing in arithmetical procession, the existing information searching has a limitation in satisfying users' demands for information, and in order to overcome this, various discussions and techniques for a web environment such as a web 2.0, a semantic web, and the like, are mentioned. However, the eventual purpose of such discussions is how to precisely discover information suitable for the users' demand and favorably present it. As a result, the eventual purpose of the web technique will be a question and answer technique.

Namely, because the conventional method simply processes a question for domains limited to limited answer types and extracts an answer thereto, there is a limitation in satisfying users' demands (e.g., the efficiency of document searching, accuracy of extraction of an answer, etc.) for information searching.

SUMMARY OF THE INVENTION

In view of the above, the present invention provides a question type and domain identifying apparatus and method for classifying a user's question into a question appropriate for a question and answer and a query appropriate for information searching to identify the user's question, distributing the user's question to question and answer engines of respective domains, and restricting a search target document with a question subject (or question theme) and area information, to thereby effectively find an answer to the user's question.

In accordance with a first aspect of the present invention, there is provided a question type and domain identifying apparatus, the apparatus including:

a question type identifier for recognizing the number of words of a user's question to identify whether or not the user's question is a query for performing information searching or a question for performing a question and answer;

a question domain distributor for distributing one of plural preset domain specialized question and answer engines, as a question and answer engine of the user's question based on the recognized word number; and a question and answer engine block, including the domain specialized question and answer engines, for selectively performing information searching or a question and answer with respect to the user's question in response to the distribution of the question domain distributor.

In accordance with a second aspect of the present invention, there is provided a question type and domain identifying method, the method including:

recognizing the number of words of a user's question to identify whether or not the user's question is a query for performing information searching or a question for performing a question and answer;

distributing one of plural preset domain specialized question and answer engines, as a question and answer engine of the user's question, based on the recognized word number; and selectively performing information searching or a question and answer with respect to the user's question by using the domain specialized and question and answer engine distributed as the question and answer engine.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with the accompanying drawings.

In the following description, well-known functions or constitutions will not be described in detail if they would obscure the invention in unnecessary detail. Further, the terminologies to be described below are defined in consideration of functions in the present invention and may vary depending on a user's or operator's intention or practice. Therefore, the definitions should be understood based on all the contents of the specification.

First of all, the present invention approaches various issues to be considered in processing a question in the event of question and answer in an open web environment, and proposes various technical methods appropriate for processing a question in question and answer in a web environment.

First, the most important thing in analyzing a question for open web question and answer is to identify a type of the question. Users express what kind of information they request through questions. Here, the users' request may be a particular answer or a particular document. Namely, when information required by a user is comprehensive information of a particular object, document searching would satisfy the user's request, while when the user requests information regarding the attribute of a particular object, question and answer results would meet the user's request. Thus, more effective information can be provided by identifying a user's request whether or not it is a query or a question and differentiating a processing method. Therefore, it is necessary to identify whether or not a user's question is a query which requires information searching or a question which requires question and answer. To this end, the present invention proposes a technical concept for identifying whether or not a user's question is a query requiring information searching or a question requiring question and answer.

Second, for an open web question and answer including a previously developed domain specialized question and answer engine, it is important to identify through which question and answer engines an answer to a user's question could be effectively presented. For example, for a question related to a travel, a question and answer engine specialized for a travel domain could be able to provide more correct results. Namely, it is considered that distribution of users' questions to question and answer engines specialized for various domains is a key to improvement of the performance of an open web question and answer. Thus, the present invention proposes the technique of distributing a user's question to question and answer engines specialized for various domains.

Third, a document having a high possibility of including an answer is searched in the web environment. However, because numerous documents are distributed in the web, searching every document distributed in the web would be a considerable burden in terms of time. Thus, in the present invention, a method for restricting documents is first performed before a searching operation. Namely, search target documents are restricted on the basis of a question subject identified in a question and area information in the question.

To this end, the present invention proposes a scheme for identifying a question subject and identifying various types of area information included in the question.

Namely, as discussed above, the present invention provides a technical method for identifying a question type reflecting the characteristics of an open web question and answer, distributing a question to question-and-answers specialized for domains, and identifying a question subject and area information for document filtering.

Figure 1:
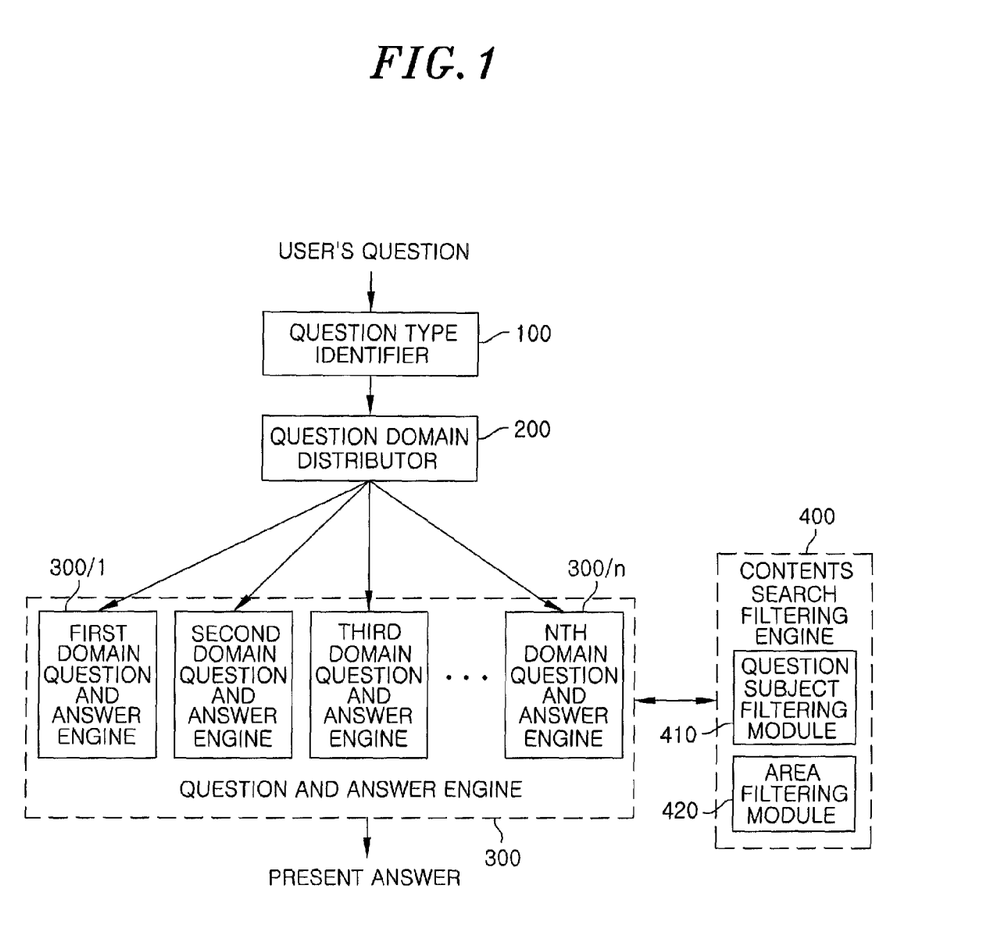
FIG. 1 shows a block diagram of a question type and domain identifying apparatus in accordance with an embodiment of the present invention.

FIG. 1 shows a block diagram of a question type and domain identifying apparatus in accordance with an embodiment of the present invention.

The question type and domain identifying apparatus includes a question type identifier 100, a question domain distributor 200, a question-and-answer engine 300, a contents search filtering engine 400, and the like. The question-and-answer engine 300 includes a plurality of domain question-and-answer engines 300/1 to 300/n. The contents search filtering engine 400 includes a question subject filtering module 410, an area filtering module 420.

Referring to FIG. 1, the question type identifier 100 recognizes the number of words in a user's question to identify whether or not the user's question is a query requiring information search or a question for performing question and answer. A detailed process for identifying the type of the user's question will be described in detail with reference to FIG. 2. Here, users' questions and the type of the questions may be, for example, those as shown in Table 1.

TABLE 1

| TEXT TYPE | PROCESS TYPE | DESCRIPTION | EXERCISE QUESTION |
|---|---|---|---|
| Query | Information search | A keyword query requiring comprehensive information | England |
| Keyword array question | Question and answer | A question requiring information on attribution of particular object in its meaning although it has a form of keyword array | The number of population in England |
| Natural language question | Question and answer | A question in form of natural language | How many population in England? |

Figure 2:
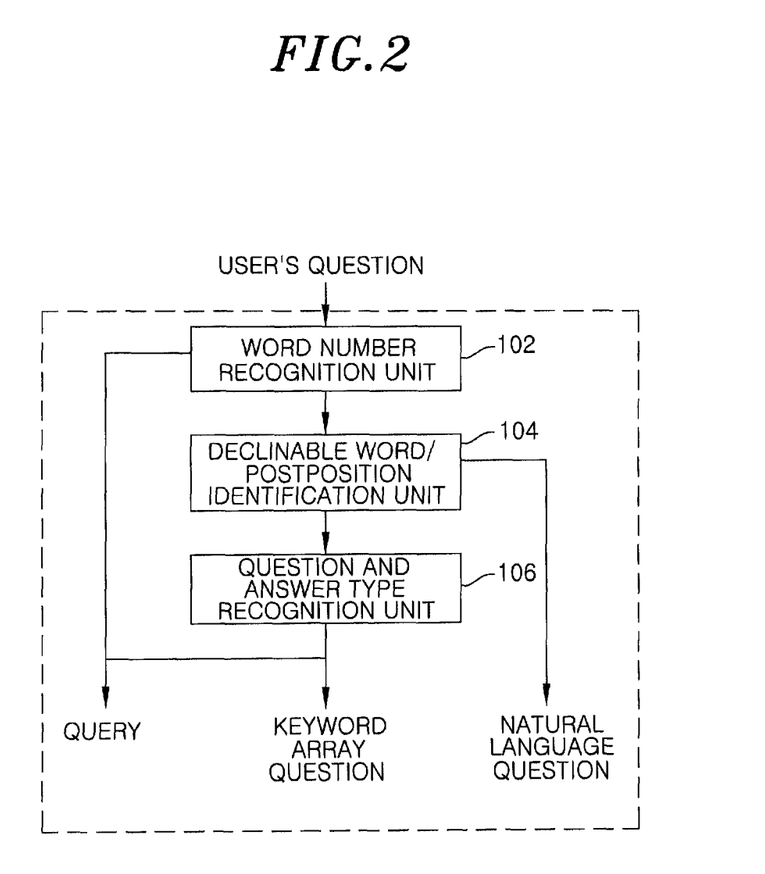
FIG. 2 illustrates a detailed block diagram of the question type identifier shown in FIG. 1.

FIG. 2 presents a detailed block diagram of the question type identifier 100 illustrated in FIG. 1. The question type identifier 100 includes a word number recognition unit 102, a declinable word/postposition identification unit 104, a question and answer type recognition unit 106, and the like.

Referring to FIG. 2, the word number recognition unit 102 recognizes the number of words in a user's question to classify a type of the user's question. When the recognized number of words is one, the word number recognition unit 102 classifies the question as a query requiring information search and provides the corresponding information to the question domain distributor 200 in FIG. 1. When the recognized number of words is two or more, the word number recognition unit 102 provides the question to the declinable word/postposition identification unit 104.

Next, the declinable word/postposition identification unit 104 identifies whether or not the user's question having two or more words contains a declinable word or a postposition. When the user's question is identified to include a declinable word or a postposition, the declinable word/postposition identification unit 104 classifies the corresponding user's question as a natural language question and provides the user's question to the question domain distributor 200 in FIG. 1. When the user's question is determined not to include a declinable word or a postposition, the declinable word/postposition identification unit 104 provides the user's question to the question and answer type recognition unit 106.

The question and answer type recognition unit 106 categorizes the user's question into a query form or keyword array form based on recognition results of predefined question and answer type, and sends the same to the question domain distributor 200 of FIG. 1. Here, the answer type is divided into a named entity (NE) answer type (NE tag) used in named entity recognition and a descriptive answer type. The NE answer type may include, for example, those illustrated in Table 2, and the descriptive answer type may include, for example, those illustrated in Table 3. Namely, Table 2 is exemplary views showing examples of the NE answer types and their definitions, and Table 3 is an exemplary view showing examples of the descriptive answer types and their patterns.

TABLE 2

| NE ANSWER TYPE (NE TAG) | DEFINITION |
|---|---|
| AT_NOT | |
| PS_OTHERS | PERSON'S NAME (X) |
| PS_NAME | PERSON'S NAME |
| PS_MYTH | NAME OF CHARCTER IN MYTH |
| PS_CHARACTER | CHARACTER'S NAME |
| PS_SINGER | SINGER (GROUP)'S NAME |
| PS_ACTOR | ACTOR'S NAME |
| PS_DIRECTOR | FILM DIRECTOR |
| FD_OTHERS | ACADEMIC FIELD |
| FD_SCIENCE | SCIENCE-RELATED ACADEMIC FIELD AND SCIENCE SCHOOL |
| FD_SOCIAL_SCIENCE | SOCIAL SCIENCE-RELATED ACADEMIC FIELD AND SCHOOL |
| FD_MEDICINE | MEDICAL SCIENCE-RELATED ACADEMIC FIELD AND SCHOOL |
| FD_ART | ART-RELATED ACADEMIC FIELD AND SCHOOL (SECT) |
| FD_PHILOSOPHY | PHILOSOPHY-RELATED ACADEMIC FIELD AND SCHOOL (SECT) |
| TR_OTHERS | NAMES OF PARTICULAR THEORY, LAW, PRINCIPLE, ETC. |
| TR_SCIENCE | SCIENCE-RELATED THEORY/LAW/METHOD |
| TR_TECHNOLOGY | MACHINE/DEVICE/SYSTEM/TECNIQUE-RELATED THEORY/LAW/METHOD |
| TR_SOCIAL_SCIENCE | SOCIAL SCIENCE THEORY/LAW/METHOD |
| TR_ART | ART-RELATED THEORY/LAW/METHOD |
| TR_PHILOSOPHY | PHILOSOPHICAL THEORY/IDEA |
| TR_MEDICINE | MEDICAL TREATMENT/PRESCRIPTION, MEDICAL DIAGNOSIS METHOD |
| AF_OTHERS | ARTIFACT (X) |
| AF_CULTURE | |
| AL_ASSET | NAME OF CULTURAL ASSETS |
| AF_BUILDING | BUILDING/CIVIL ERECTION, NAME OF PLAYGROUND, APARTMENT, BRIDGE, LIGHTHOUSE |
| AF_MUSICAL_INSTRUMENT | NAME OF MUSICAL INSTRUMENT |
| AF_ROAD | NAME OF ROAD/RAILROAD |
| AF_WEAPON | NAME OF WEAPON |
| AF_TRANSPORTn | TRANSPORTATION/VEHICLE/SHIP MODEL AND TYPE, TRANSPORT MEANS, RIDE |
| AF_WORKS | NAME OF WORK |
| AFW_GEOGRAPHY | GEOGRAPHY BOOK, MAP |
| AFW_MEDIC | |
| AFW_SCIENCE | SCIENCE-RELATED BOOK |
| AFW_RELIGION | RELIGIOUS BOOK, SCRIPTURES OF EACH RELIGION |
| AFW_PHILOSOPHY | PHILASOPHY-RELATED BOOK |
| AFW_ART | WORK OF ART (X) |
| AFWA_DANCE | NAME OF DANCE WORK |
| AFWA_MOVIE | NAME OF MOVIE WORK |
| AFWA_LITERATURE | NAME OF LITERATURE SUCH AS POETRY/NOVEL/PLAY |
| AFWA_ART_CRAFT | NAME OF FINE ART-RELATED WORK (PICTURE/WORK OF ART) |
| AFWA_THEATRICALS | NAME OF PLAY/PERFORMANCE |
| AFWA_MUSIC | NAME OF MUSIC WORK |
| AFWA_PROGRAM | NAME OF TV PROGRAM |
| OG_OTHERS | NAME OF INSTITUTION/ORGANIZATION |
| OGG_ECONOMY | BANK, CARD COMPANY, INSURER? |
| OGG_EDUCATION | SCHOOL, INSTITUTE, NERSERY |
| OGG_MILITARY | MILITARY INSTITUTION |
| OGG_MEDIA | BROADCAST STATION, NEWSPAPER COMPANY |
| OGG_SPORTS | SPORTS-RELATED GROUP, SPORTS TEAM |
| OGG_ART | MUSEUM, THEATER, CINEMA HOUSE |
| OGG_SOCIETY | SOCIAL INSTITUTION/ORGANIZATION |

TABLE 2-continued

| NE ANSWER TYPE (NE TAG) | DEFINITION |
|---|---|
| OGG_MEDICINE | HOSPITAL/DRUG STORE |
| OGG_RELIGION | RELIGIOUS INSTITUTION |
| OGG_SCIENCE | SCIENCE INSTITUTION |
| OGG_BUSINESS | OFFICE, SHOPPING CENTER, CONVENTION CENTER, FISHING PLACE, DEPARTMENT STORE, FARM, MART |
| OGG_LIBRARY | LIBRARY |
| OGG_LAW | LAW INSTITUTION |
| OGG_POLITICS | POST OFFICE, POLICE STATION, FIRE STATION, VILLAGE OFFICE, TELEPHONE OFFICE |
| OGG_GAME | NAME OF GAME ORGANIZATION (EXCLUDING GAME COMPANY) |
| OGG_FOOD | NAME OF RESTAURANT |
| OGG_HOTEL | HOTEL, MOTEL, PRIVATE RESIDENCE, PENSION, CONDOMINIUM, RESORT |
| LC_OTHERS | SUBWAY/TRAIN STATION, AIRPORT, BUS TERMINAL, IC, MARKET, POWER PLANT, STOP, COMPLEX, PORT |
| LCP_COUNTRY | NAME OF COUNTRY |
| LCP_PROVINCE | NAMES OF PROVINCE AND STATE |
| LCP_COUNTY | NAMES OF DETAILED ADMINISTERATIVE DISTRICT SUCH AS GUN, MYEON, EUP, RI, DONG, ETC, ~VILLAGE |
| LCP_CITY | NAME OF CITY |
| LCP_CAPITALCITY | NAME OF CAPITAL |
| LCG_RIVER | RIVER, LAKE, POND |
| LCG_OCEAN | NAME OF OCEAN/SEA |
| LCG_BAY | NAME OF PENSULA/GULF |
| LCG_MOUNTAIN | NAME OF MOUNTAIN RANGE/MOUNTAIN |
| LCG_ISLAND | NAME OF ISLAND/ARCHIPELAGO |
| LCG_TOPOGRAPHY | NAME OF TOPOGRAPHY |
| LCG_CONTINENT | NAME OF CONTINENT |
| LC_TOUR | HOT SPRING, BEACH, TOURIST RESORT/SEASHORE, BOTANICAL GARDEN, ARBORETUM, GARDEN, PARK, STUDIO, PLAZA, THEME PARK, FARM/PLANTATION, WATERFALL, VALLEY, CAVE |
| LC_SPACE | NAMES OF CELESTIAL BODIES, FIXED STAR, ASTEROID, SATELLITE, SHOOTING STAR, AND CONSTELLATION |
| LC_GAME | PLACE USED IN GAME |
| CV_OTHERS | TERM RELATED TO CIVILIZATION/CULTURE (X) |
| CV_NAME | NAME OF CIVILIZATION/CULTURE |
| CV_TRIBE | NAME OF HUMAN RACE/TRIBE OR PEOPLE CONSTITUTING NATION |
| CV_SPORTS | NAME OF SPORTS/LEPORTS/LEISURE |
| CV_SPORTS_INST | NAME OF ARTICLES/TOOLS OF SPORTS/LEPORTS/LEISURE |
| CV_POLICY | NAME OF SYSTEM/POLICY, NAME OF CV_TAX TAXATION |
| CV_FUNDS | NAMES OF PENSION AND FUND |
| CV_LANGUAGE | NAME OF LANGUAGE |
| CV_BUILDING TYPE | NAME OF STYLE OF ARCHITECTURE |
| CV_FOOD | NAME OF FOOD/GRAIN |
| CV_DRINK | NAME OF BEVERAGE/ALCOHOL |
| CV_CLOTHING | NAME OF CLOTHING/FIBER |
| CV_POSITION | NAME OF POSITION |
| CV_RELATION | NAME OF HUMAN RELATION |
| CV_OCCUPATION | NAME OF OCCUPATION |
| CV_CURRENCY | NAME OF CURRENCY |
| CV_PRIZEn | PRIZE AND MEDAL |
| CV_LAW | NAME OF LAW |
| CVL_RIGHT | LEGAL RIGHT |
| CVL_CRIME | NAME OF CRIME |
| CVL_PENALTY | NAME OF PENALTY |
| CV_FOOD_STYLE | TYPE OF FOOD (KOREAN STYLE, JAPANESE STYLE, WESTERN STYLE, ETC.) |
| DT_OTHERS | DATE/ERA |
| DT_DURATION | PERIOD |
| DT_DAY | DAY |
| DT_MONTH | MONTH |
| DT_YEAR | YEAR |
| DT_SEASON | SEASON |
| DT_GEOAGE | GEOGRAPHICAL AGE |
| DT_DYNASTY | DYNASTY AGE |
| TI_OTHERS | TIME |
| TI_DURATION | DURATION |

TABLE 2-continued

| NE ANSWER TYPE (NE TAG) | DEFINITION |
| --- | --- |
| TI_HOURS | HOUR |
| TI_MINUTE | MINUTE |
| TI_SECOND | SECOND |
| QT_OTHERS | EXPRESSION OF AMOUNT |
| QT_AGE | AGE |
| QT_SIZE | SIZE |
| QT_LENGTH | LENGTH/DISTANCE/HEIGHT |
| QT_COUNT | NUMBER, FREQUENCY |
| QT_MAN_COUNT | NUMBER OF PERSONS |
| QT_WEIGHT | WEIGHT |
| QT_PERCENTAGE | PERCENTAGE, RATIO, DENSITY |
| QT_SPEED | SPEED |
| QT_TEMPERATURE | TEMPERATURE |
| QT_VOLUME | VOLUME |
| QT_ORDER | ORDER, SEQUENTIAL EXPRESSION |
| QT_PRICE | PRICE |
| QT_PHONE | PHONE NUMBER |
| QT_SPORTS | EXPRESSION OF AMOUNT RELATED TO SPORTS (SCORE, ETC.) |
| QT_CHNAAEL | TV CHANNEL NUMBER |
| QT_ALBEM | EXPRESSION OF AMOUNT RELATED TO ALBUM (FIRST ALBUM, SECOND ALBUM, ETC.) |
| QT_ZIPCODE | ZIP CODE |
| EV_OTHERS | NAME OF PARTICULAR INCIDENT/ACCIDENT |
| EV_ACTIVITY | SOCIAL ACTIVITY AND DECLARATION |
| EV_WAR_REVOLUTION | WAR/REVOLUTION |
| EV_SPORTS | SPORTS/LEISURE-RELATED EVENT |
| EV_FESTIVAL | NAME OF FESTIVAL |
| EV_GAME | NAME OF GAME-RELATED EVENT |
| AM_OTHERS | NAME OF ANIMAL |
| AM_INSECT | INSECT |
| AM_BIRD | BIRD |
| AM_FISH | FISH |
| AM_MAMMALIA | MAMMAL |
| AM_AMPHIBIA | AMPHIBIAN |
| AM_REPTILIA | REPTILE |
| AM_TYPE | NAME OF ANIMAL CATEGORIZATION |
| AM_PART | PORTION/PART OF ANIMAL |
| PT_OTHERS | NAME OF PLANT |
| PT_FRUIT | NAME OF FRUIT |
| PT_FLOWER | FLOWER |
| PT_TREE | TREE |
| PT_GRASS | GRASS |
| PT_TYPE | NAME OF PLANT TYPE |
| PT_PART | NAME OF PART OF PLANT |
| MT_OTHERS | NAME OF MATERIAL |
| MT_ELEMENT | NAME OF ELEMENT |
| MT_METAL | METAL MATERIAL |
| MT_ROCK | ROCK |
| MT_CHEMICAL | CHEMICAL MATERIAL |
| MTC_LIQUID | LIQUID CHEMICAL MATERIAL |
| MTC_GAS | GASEOUS CHEMICAL MATERIAL |
| TM_OTHERS | TERM (X) |
| TM_COLOR | COLOR |
| TM_DIRECTION | DIRECTION |
| TM_CLIMATE | NAME OF CLIMATE AREA |
| TM_SHAPE | SHAPE/FORM |
| TM_CELL_TISSUE | CELL/TISSUE, NAME OF CELL, AND NAME OF TISSUE AND ORGAN OF LIVING THING |
| TMM_DISEASE | SYMPTOMS/ILLNESS/DISEASE |
| TMM_DRUG | MEDICINE/DRUG NAME |
| TMI_HW | HARDWARE TERM |
| TMI_SW | SOFTWARE TERM |
| TMI_SITEurl | ADDRESS |
| TMI_EMAIL | E-MAIL ADDRESS |
| TMI_MODEL | MODEL NAME OF VARIOUS PRODUCTS (LM1000-2CX, ETC.) |
| TMI_SERVICEIT | SERVICE TERM (WIBRO SERVICE, DMB SERVICE) |
| TMI_PROJECT | NAME OF PROJECT |
| TMIG_HW | GAME-RELATED HARDWARE TERM |
| TMIG_SW | GAME SOFTWARE |
| TMIG_GENRE | GAME GENRE |
| TMIG_UNIT | NAME OF UNIT IN GAME (CHARACTER TRIBE, UNIT, MONSTER, NPC) |
| TMIG_ITEM | NAME OF ITEM IN GAME (GAME WEAPON, DEFENSE SECTOR, ACCESSARY, TREASURE, ETC.) |

TABLE 2-continued

| NE ANSWER TYPE (NE TAG) | DEFINITION |
|---|---|
| TMIG_SKILL | NAME OF SKILL IN GAME |
| TMIG_QUEST | NAME OF QUEST IN GAME |
| TMIG_LEVEL | LEVEL IN GAME |
| TMIG_SERVER | NAME OF GAME SERVER |
| TM_SPORTS | SPORTS/LEISURE TERM (TECHNIQUE, RULE NAME) |

TABLE 3

| DESCRIPTIVE ANSWER TYPE | EXAMPLE/PATTERN |
|---|---|
| DEFINITION | A tsunami is a large wave, often caused by an earthquake. [X is Y] |
| FUNCTION | An air bladder is an air-filled structure in many fishes that functions to maintain buoyancy or to aid in respiration. [X that function to Y] |
| KIND | The coins in the United States are 1 cent, 5 cents, 25 cents, and 100 cents. [X are Y1, Y2, . . . , and Yn] |
| METHOD | The method that prevents a cold is washing your hands often. [The method that/of X is Y] |
| CHARACTER | A sea horse characteristically swims in an upright position and has a prehensile tail. [X is characteristically Y] |
| OBJECTIVE | An automobile used for land transports. [X used for Y] |
| REASON | A tsunami is a large wave, often caused by an eqrthquake. [X is caused by Y] |
| COMPONENT | An automobile is usually composed of 4 wheels, an engine, and a steering wheel. [X is composed of Y1, Y2, . . . , and Yn] |
| PRINCIPLE | Osmosis is the principle, transfer of a liquid solvent through a semipermeable membrane that does not allow dissolved solids to pass. [X is the principle, Y] |
| ORIGIN | The Achilles tendon was named after the mythical Greek hero Achilles. [X is named after Y] |

Specifically, the question and answer type recognition unit 106 classifies the user's question as a query when a weight value of a question and answer type does not exceed a preset threshold value, and classifies the user's question as a keyword array question when the weight value exceeds the preset threshold value.

For example, when an answer type is determined on the basis of a law made in a normal expression, a weight value 0.2 may be assigned thereto, and in case of an answer type determined by the form of an interrogative, a weight value 1.0 may be assigned. For these two cases, the user may determine the weight values according to experience. Meanwhile, weight values of the other remnant are determined by a structured support vector machine (SVM) learning model, and in this case, a numerical value smaller than 1 is generally given, which means that the weight values are automatically determined depending on learning data.

Also, the preset threshold value may be determined according to a user experience, or may be dynamically designated based on a ratio of difference values among weight values after sequencing the weight values. For example, when it is assumed that weight values of A, B, and C are 0.9, 0.85, and 0.5, respectively, because the difference between 0.85 and 0.5 is remarkable as compared to the difference between 0.9 and 0.85, only A and B are selected as answer types, and in this case, the threshold value is 0.85.

Referring back to FIG. 1, the question domain distributor 200 distributes one of the preset domain specialized question and answer engines, namely, one of the first domain question and answer engine 300/1 to nth domain question and answer engine 300/n, to a question and answer engine of the user's question based on the result value obtained by recognizing the number of words, namely, depending on whether or not the user's question is a query for information searching, a natural language question, or a keyword array type question. A detailed process of distributing the user's question to a question and answer engine as such will now be described in detail with reference to FIG. 3.

Figure 3:
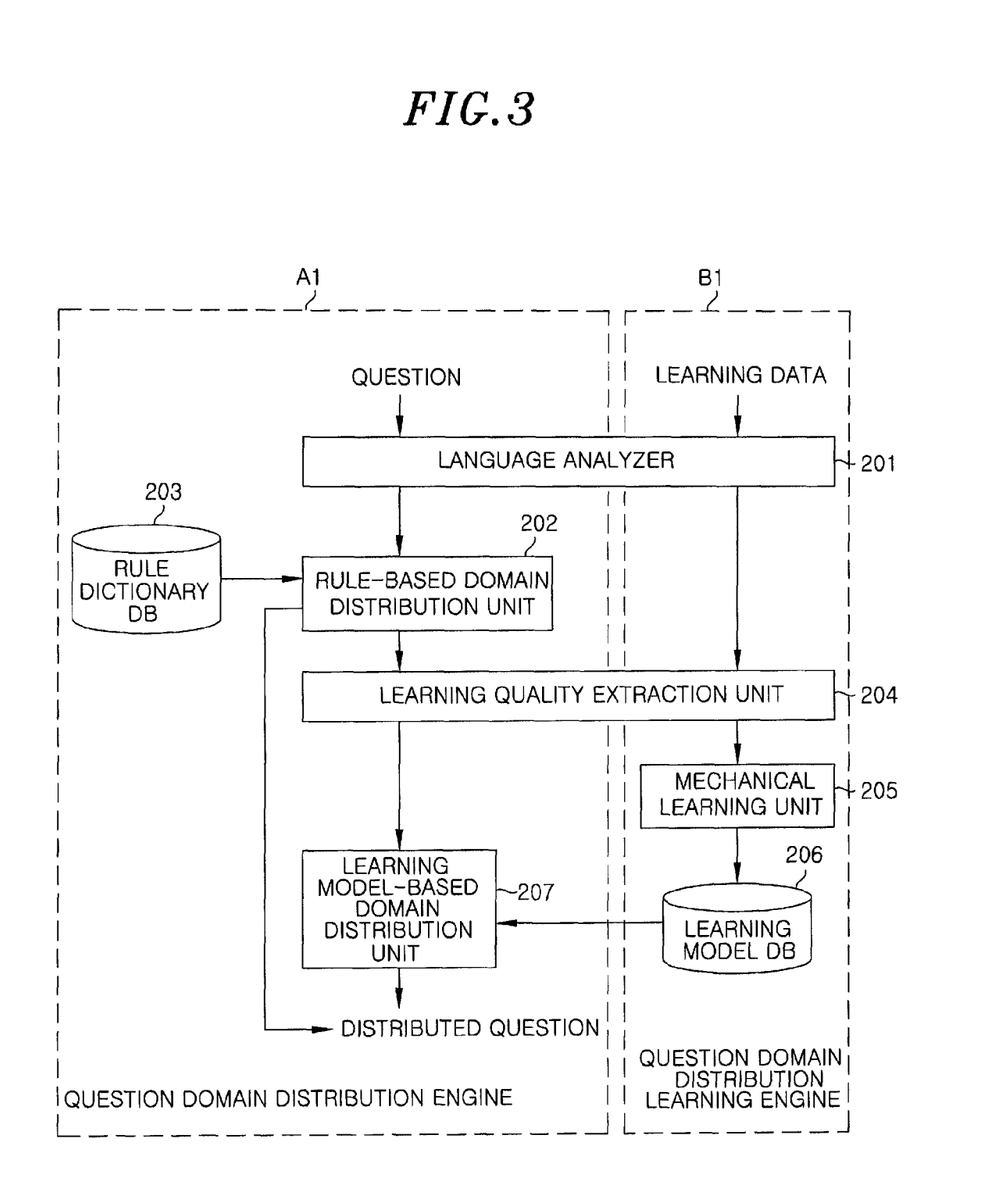
FIG. 3 provides a detailed block diagram of the question domain distributor shown in FIG. 1.

FIG. 3 illustrates a detailed block diagram of the question domain distributor 200 shown in FIG. 1. The question domain distributor 200 is a module for distributing a domain with respect to the user's question (namely, which determines a question and answer engine for processing the user's question among various domain-specialized question and answer engines) on the basis of a hybrid technique combining mechanic learning and laws, namely, on the basis of a law dictionary established by domain or a learning model established by using learning data. The question domain distributor 200 may be divided into a question domain distribution engine A1 and a question domain distribution learning engine B1. Specifically, the question domain distributor 200 may include a language analyzer 201, a law-based domain distribution block 202, a law dictionary DB 203, a learning quality extraction block 204, a mechanical leaning block 205, a learning model DB 206, a learning model-based domain distribution block 207, and the like.

Referring to FIG. 3, the language analyzer 201 analyzes the language of the user's question and provides the analysis results to the law-based domain distribution block 202, and analyzes the language of the learning data established as representative questions of the respective domains and provides the analysis results to the leaning quality extraction block 204. Here, the representative questions may include, for example, those as illustrated in FIG. 9, which means a collection of questions the engines are able to process by domain. A domain of a corresponding question is tagged to the representative questions through a manual operation, and these can be utilized as learning data.

More specifically, the language analyzer 201 may utilize a morpheme analysis, named entity (NE) recognition, chunking, and a vocabulary meaning analysis, and these operations may be performed in the order arranged as described above. Here, the morpheme analysis is determining a part of speech, the NE recognition is recognizing a major entity (See FIG. 7), chunking refers to a technique of grouping words by phrases such as a noun phrase, a verb phrase, and the like. The vocabulary meaning analysis is discriminating the meaning of individual vocabularies. For example, in case of '배', the meanings of 'transportation', 'body part', 'fruit', and the like are identified on the basis of context information in the sentence.

For example, when the user's question is 'Where is it worth a visit in Daejeon?', morpheme analysis and chunking results may appear as follows:

(대전/nc_I 에서/jc_O):NP
(가/pv_I 어/ec_O<어요> 보/px_O ㄹ/etm_O>ㄹ만하>만하/px_O ㄴ가/etm_O):VP
(여행/nc_I 지/xsn_I 는/jx_O):NP
(이디/np_I 이/co_O ㄴ가/ef_O 요/jx_O ㄴ가/s_O):VP And, the results of the morpheme analysis, NE recognition, vocabulary meaning analysis may appear as follows:

<LCP_CITY: 대전/nc[ 지역 ]>+ 에서/jc_가/pv+ 이/ec+ 보/px+ 대전/etm+/ 만하 px+ ㄴ/etm 여행/nc [ 활동 ]+ 지/xsn+ 이디/jx 이디/np+ 이/co+ ㄴ가/ef+ 요/jx ?/s The law-based domain distribution block 202 serves to identify and distribute a domain for the user's question (i.e., determining a question and answer domain) on the basis of the law dictionary that is predefined for each domain with respect to the language analysis results over the user's question and stored in the law dictionary DB 203. Namely, the law-based domain distribution block 202 serves to determine one of the respective domain question and answer engines of the question and answer engine block 300 in FIG. 1 as a question and answer domain. To this end, the law dictionary DB 203 stores law dictionaries previously defined and established for each domain.

For example, in general, questions to be distributed to a question and answer engine specialized as a 'sports' domain are highly likely to include names of sports events, so when a user's question includes the name of a sports event, it has a high possibility of being a question of the 'sports' domain. For example, when a user's question 'how many football referees?' is input, the user's question will be distributed to a sports domain question and answer engine based on the 'football' keyword.

The learning quality extraction block 204 extracts learning qualities for mechanical learning from the language analysis results of the learning data established as representative questions of the respective domains and provides the extracted leaning qualities to the mechanical leaning block 205. Then, the mechanical learning block 205 mechanically learns the extracted learning qualities to generate a learning model, and stores the generated learning model in the learning model DB 206.

Namely, for the leaning qualities, the morpheme unit, chunking results, vocabulary meaning results, a phrase unit NGram, and the like are utilized. For example, when the user's question is 'Where is it worth a visit in Daejeon?', the learning qualities may be extracted as follows:

자질-LCP_CITY 어디PRE_QWORD=여행지 대전 가 보 만 하 여행 지 이디 이Chunk_0=대전에서 Chunk_0=대전 Chunk_0=전에Chunk_0=에서 Chunk_0=여행지는 Chunk_0=여행 Chunk_0=행지 Chunk_0= 지는 Chunk_1= 가어보ㄹ만하ㄴ Chunk_1=가어 Chunk_1=어보 Chunk_1=보ㄹ Chunk_1=ㄹ만 Chunk_1=만하 Chunk_1=하ㄴ Chunk_1=이디이ㄴ가요 Chunk_1= 어디 Chunk_2=디이 Chunk_1=이ㄴ Chunk_1=ㄴ가 Chunk_1=가요 Chunk_1= 요 ?First=대전에서Ngram=대전 FNgram=전에 FNgram=에서 Last=이디이ㄴ가요 LNgram= 어디 LNgram=디이 LNgram=이ㄴ가 LNgrame=가요 Sense= 지역 Sense= 활동

In other words, the mechanical learning model used in the present invention is supervised learning that learning data is previously established and learned. That is, various questions are collected in advance, and the user manually tags domains with respect to corresponding questions and has the mechanical learning model (e.g., structured SVM) learned by utilizing the learning data. Namely, when the user inputs a certain question, learning qualities are extracted in the same manner as when the corresponding question is learned, and to which of questions the user's input question is similar among the previously learned data is determined from the mechanical learning model and a corresponding numerical value is provided. In this case, the numerical values may be provided as n-best in a descending order, starting from the largest value.

For example, assuming that mechanical leaning has been made through the following example sentences 1 and 2, if the user inputs a question 'where is good to visit in Seoul?', the user's question is similar to the question of the example sentence 1 based on the learning qualities such as the named entity (NE), the morpheme, n-gram of each phase, and the like, so the weight value of a travel domain will be presented to be high.

Example sentence 1: Where is the most worth a visit in Daejeon?: Travel domain

Example sentence 2: What is offside in soccer? Sports domain

When a domain is not distributed on the basis of the law dictionary with respect to a user's question, the learning model-based domain distribution block 207 serves to distribute a domain with respect to the user's question on the basis of the learning model stored in the learning model DB 206.

Referring back to FIG. 1, the respective domain question and answer engines 300/1 to 300/n of the question and answer engine block 300 refer to question and answer engines specialized for respective domains. When a corresponding domain question and answer engine is distributed to a domain with respect to a user's question, the respective domain question and answer engines 300/1 to 300/n perform question and answer with respect to the user's question and, in this case, the respective domain question and answer engines 300/1 to 300/n perform document searching only for the documents included in a corresponding filtering range by utilizing a question subject and area filtering information provided from the contents search filtering engine 400 (to be described later).

Here, the utilization of the question subject and area filtering information is to avoid consumption of much time for a high precision language analysis and information extraction in searching large capacity documents and extracting an answer from a corresponding document. Through the filtering scheme, in accordance with the present invention, a minimum amount of documents appropriate for the user's question can be searched to maximize the efficiency of searching for the open web question and answer.

The contents search filtering engine 400 serves to identify a question subject and area through the analysis of the user's question, and restrict search target documents in the domain question and answer engine distributed on the basis of the identified question subject information and area information. To this end, the contents search filtering engine 400 may include a question subject filtering module 410, an area filtering module 420, and the like.

The question subject filtering module 410 serves to identify a question subject on the basis of a keyword included in the user's question and restrict the range for document searching on the basis of the identified question subject. A detailed process of restricting the range for document searching on the basis of the question subject will be described below in detail with reference to FIG. 4.

Figure 4:
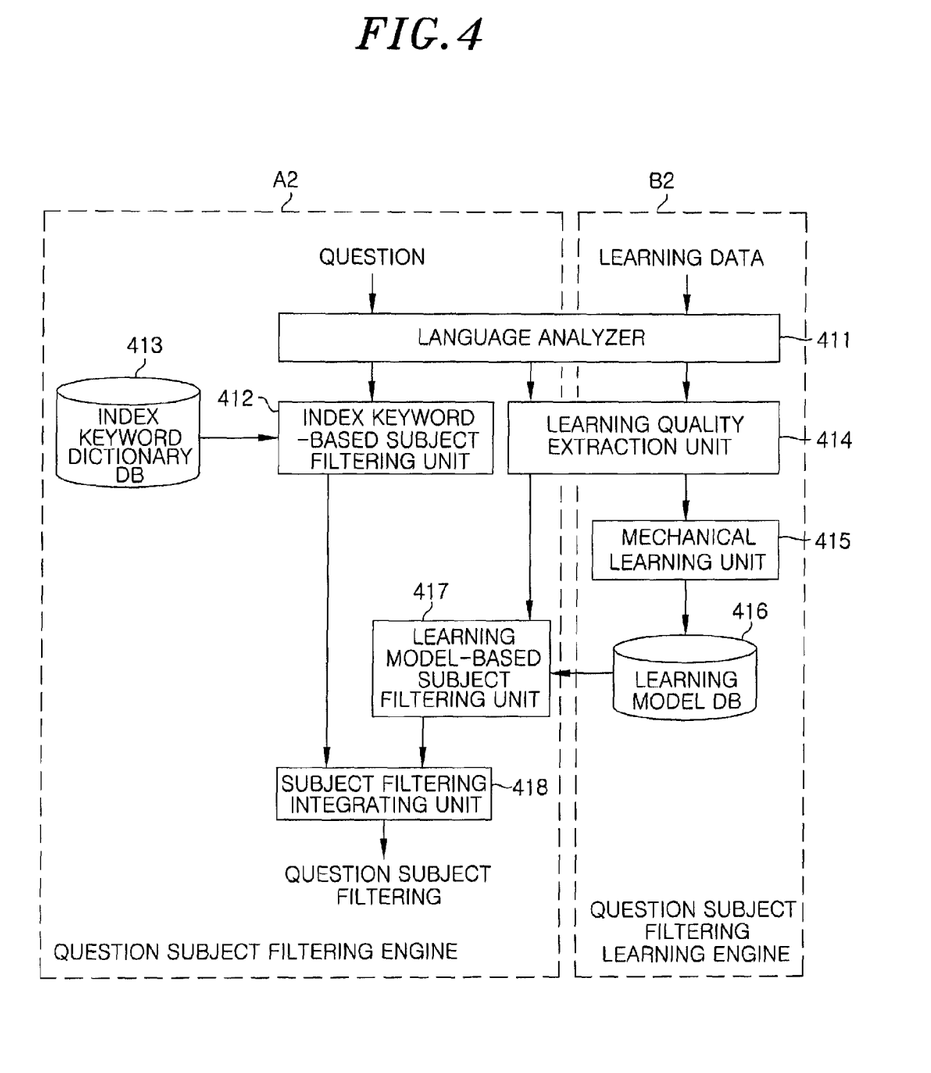
FIG. 4 depicts a detailed block diagram of the question subject filtering module shown in FIG. 1.

FIG. 4 illustrates a detailed block diagram of the question subject filtering module 410 depicted in FIG. 1. The question subject filtering module 410, which is a hybrid module obtained by combining a mechanical learning model and an index keyword statistics-based model, can be divided into a question subject filtering engine A2 and a question subject filtering learning engine B2. Specifically, the question subject filtering module 410 may include a language analyzer 411, an index keyword-based subject filtering block 412, an index keyword dictionary DB 413, a learning quality extraction block 414, a mechanical learning block 415, a learning model DB 416, a learning model-based subject filtering module 417, a subject filtering integrating block 418, and the like.

Referring to FIG. 4, the language analyzer 411 analyzes the language of a user's question to extract a keyword and provides the extracted keyword to the index keyword-based subject filtering block 412, and analyzes the language of learning data and provides the corresponding results to the learning quality extraction block 414. Here, for the subject filtering, for example, a subject classification of a news site may be utilized, and various corpuses of the news site may be utilized as learning data.

The index keyword-based subject filtering block 412 identifies statistical subject filtering information (first subject filtering information) utilizing frequency information of extracted keywords on the basis of an index keyword dictionary predefined and stored in the index keyword dictionary DB 413, and provides the identified first subject filtering information to the subject filtering integrating block 418.

The learning quality extraction block 414 extracts learning qualities from the language analysis results with respect to the user's question and provides the extracted learning qualities to the learning model-based subject filtering block 417, and extracts learning qualities for mechanical leaning from the language analysis results of the learning data and provides the extracted learning qualities to the mechanical learning block 415. Then, the mechanical learning block 415 mechanically learns the extracted learning qualities to generate a learning model, and stores the generated learning model in the learning model DB 416. Here, the extraction of the learning qualities and the mechanical learning may be performed in the same manner as the corresponding elements illustrated in FIG. 3. To this end, the learning model DB 416 stores learning models established through the language analysis with respect to the learning data and the mechanical leaning of the learning qualities.

The learning model-based subject filtering block 417 identifies subject filtering information (second subject filtering information) on the basis of the learning models stored in the learning model DB 416 with respect to the learning qualities extracted from the user's question, and provides the identified second subject filtering information to the subject filtering integrating block 418.

Finally, the subject filtering integrating block 418 integrates the first and second subject filtering information respectively provided from the index keyword-based subject filtering block 412 and the learning model-based subject filtering block 417, namely, integrates the statistical subject filtering information based on the index keywords and the subject filtering information based on the learning models, to thereby restrict the range for document searching with respect to the question subject of the user's question, and this question subject filtering information is then provided to a corresponding domain question and answer engine.

Referring back to FIG. 1, the area filtering module 420 serves to identify a point of interest (POI) keyword included in a user's question and restrict the range for document searching to an area associated with the identified POI keyword. A detailed process of restricting the range for document searching on the basis of the POI keyword (area information) will be described below in detail with reference to FIG. 5.

Figure 5:
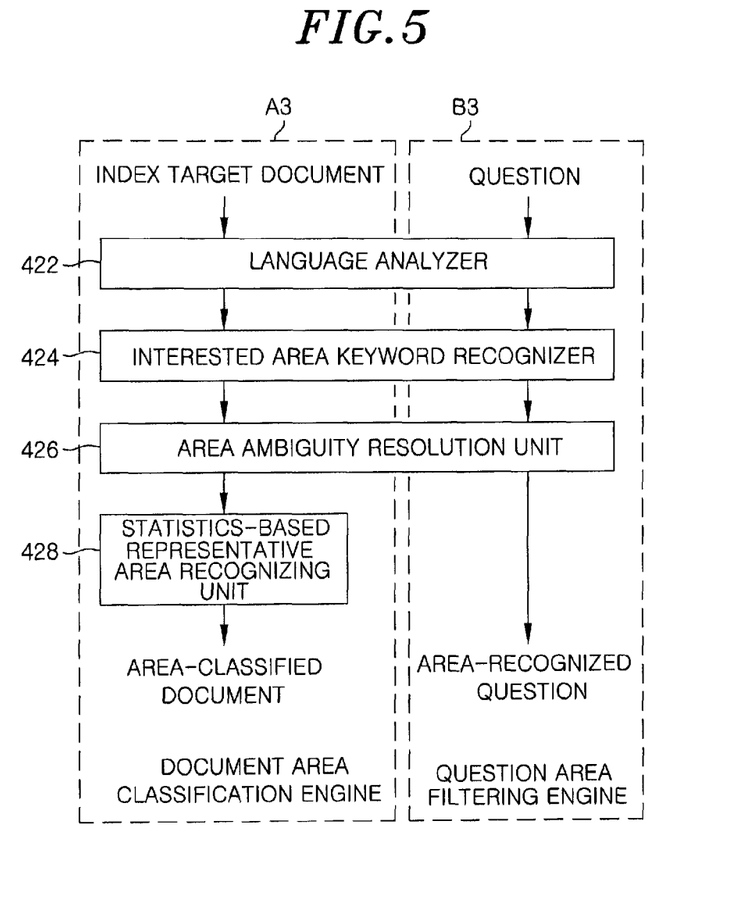
FIG. 5 presents a detailed block diagram of the area filtering module shown in FIG. 1.

FIG. 5 illustrates a detailed block diagram of the area filtering module 420 shown in FIG. 1. The area filtering module 420 may be divided into a document area classification engine A3 for identifying representative area information from an index target document and connecting it to an area information hierarchical structure and a question area filtering engine B3 for identifying question area information of a user's question. Specifically, the area filtering module 420 may include a language analyzer 422, a POI keyword identifier 424, an area ambiguity resolution block 426, a statistics-based representative area identification unit 428, and the like.

Referring to FIG. 5, the language analyzer 422, which includes, for example, an NE identifier, analyzes the language of an index target document to identify various names of areas (locations) and names of organizations, and identifies question area information through a language analysis with respect to the user's question and provides the recognized information to the POI keyword identifier 424.

The POI keyword identifier 424 selects a POI keyword target from among the identified NEs, identifies area information by using a POI keyword dictionary, and provides the same to the area ambiguity resolution block 426.

Here, the POI refers to a major point generally known by users. For example, the POI may be a name of a major place or names of major buildings used in navigation, and such POI information may be received from a contents provider (CP). Besides, information regarding nationwide addresses may be established as a dictionary of POIs and used. When the user inputs a question, a named entity with respect to the question may be identified, a character string identified as a named entity of an LC* and OG* group is recognized from the dictionary, to thereby identify whether or not it is a major POI.

For example, when it is assumed that a user's question such as the following example is input, 'Chungcheong-do' is major information, and 'Gyeryong-san' is a character string corresponding to a POI. The two character strings are looked up in the dictionary, the corresponding GPS information and address code information are brought to recognize that it is Gyeryong-san in Gongju, Chungcheong-do, whereby it can be identified as a POI of the user.

Example sentence: Any restaurant that provides delicious boiled chicken near Gyeryong-san, Chungcheong-do?

The area ambiguity resolution block 426 serves to eliminate ambiguity of the identified area information by using other keywords associated with the POI keywords. In this case, because the user's question is generally configured with only a POI keyword designating only a particular area, it may be set such that only the language analysis with respect to the user's question, the POI keyword identifying, and the area ambiguity resolution are performed to restrict the area information.

In general, area information identified from a document involves ambiguity. For example, a POI keyword 'San Jose' involves various ambiguity such as 'the capital of Costa Rica', 'port city of Guatemala', 'City of U.S.', and the like. However, if there is a POI keyword 'Costa Rica' nearby, the ambiguity of 'San Jose' can be resolved, namely, the 'San Jose' can be identified to mean the capital of Costa Rica. In this manner, the ambiguity of POI keywords can be resolved by other POI keyword existing nearby.

The statistics-based representative area identification unit 428 selects area information representing the document among the area information whose area ambiguity has been resolved. Namely, it restricts the range for document searching with respect to the associated area on the basis of the frequency of the POI keyword and location information. Such area filtering information is provided to a corresponding domain question and answer engine.

In general, there may be information regarding various areas in an index target document, and such area information may be statistically calculated based on the frequency of the present POI keyword and location information. For example, a POI keyword positioned at a title of the document may be considered to be more important than a POI keyword present in text, and a POI keyword present 100 times may be considered to be more important than a POI keyword present 10 times in text. Thus, the position and frequency information of the POI keyword in the document may be statistically calculated to identify representative area information of the document. When a weight value of the representative area information is greater than a preset threshold value, plural area information are recognized as representative area information and connected to the area classification hierarchical structure of FIG. 6.

Here, the weight value can be automatically calculated in accordance with a designated rate on the basis of user's experience by synthesizing whether or not the POI information is present in the title or in the text and how many times it is present. For example, when it is assumed that 'Daejeon' is present twice in the title, three times in the text, Seoul is present once in the title and five times in the text, a weight value rate with respect to area information present in the title is given 0.8, and that for area information present in the text is given 0.2, the weight values of 'Daejeon' and 'Seoul' can be calculated as follows:

$$\text{Daejeon: } (2/3)*0.8+(3/8)*0.2=0.61$$

$$\text{Seoul: } (1/3)*0.8+(5/8)*0.2=0.39$$

Figure 6:
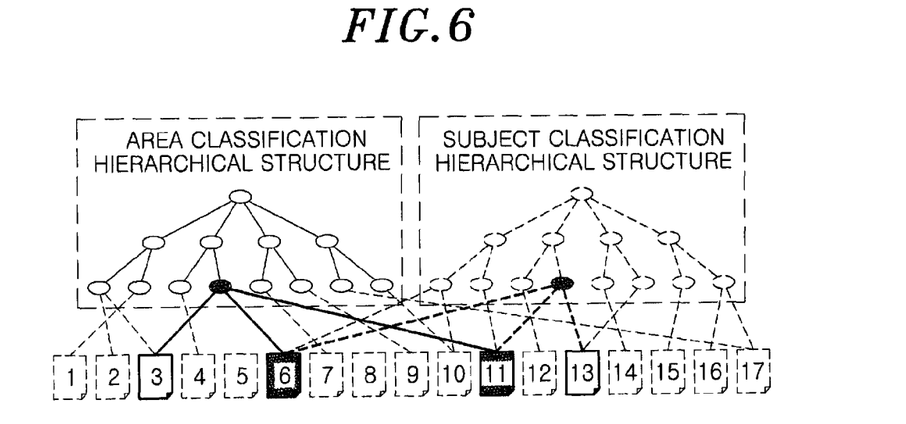
FIG. 6 is a conceptual view showing an example for explaining a method for restricting a search target document for an open web question and answer.

FIG. 6 is a conceptual view showing an example for explaining a method for restricting a search target document for an open web question and answer.

Referring to FIG. 6, the concept of a document filtering based on question subject information and area information is shown, and in general, area information has a hierarchical structure. For example, when a metropolitan city and province is at the uppermost position and Si/Gu/Gun—Eup/Myeon/Dong—Ri follow in a hierarchical form. Also, the question subject information has a hierarchical structure. For example, 'Soccer', 'Baseball', and 'Basket ball', and the like may be sub-subjects of 'Sports' subject. When search target documents are classified and connected to the hierarchically configured area information and question subject information, they can be schematized in the form as shown in FIG. 6.

Namely, when subject classification information and representative area information with respect to all the search target documents are recognized and connected and a user's question is analyzed to recognize subject classification information and area information for filtering as shown in FIG. 6, the range of the search target documents can be drastically reduced. For example, when it is assumed that R is identified as area classification information and S is identified as subject classification information in the question, documents 6 and 11 which are repeated in documents 3, 6, 11 connected to R in the area classification hierarchical structure and documents 6, 11, and 13 connected to S in the subject classification hierarchical structure will be targets of information searching. Of course, when a desired answer cannot be extracted from the corresponding documents, the range for document searching may be extended to the documents 3 and 13.

As described above, in accordance with the present invention, a user's question is classified and identified as a question appropriate for a question and answer and a query appropriate for information searching, and distributed to a corresponding question and answer engine of domains, and an answer to the user's question is searched through a scheme of restricting the search target documents to a question subject and area information, thereby maximizing the efficiency of document searching for an extraction of an answer as well as further increasing the accuracy of the extraction of the answer.

While the invention has been shown and described with respect to the particular embodiments, it will be understood by those skilled in the art that various changes and modification may be made.

What is claimed is:

1. A question type and domain identifying apparatus, the apparatus comprising:
a question type identifier for recognizing a number of words of a user's question to identify whether the user's question is a query for performing information searching or a question for performing a question and answer;
a plurality of domain specialized question and answer engines; and
a question domain distributor for distributing one of the plurality of domain specialized question and answer engines, as a question and answer engine of the user's question based on the recognized word number,
wherein the plurality domain specialized question and answer engines selectively perform information searching or a question and answer with respect to the user's question in response to the distribution of the question domain distributor,
wherein the question type identifier includes a word number recognition unit for classifying the user's question as the query for information searching when the recognized word number is one, a declinable word/postposition identification unit for classifying the user's question as a natural language question when the recognized word number is two or more and a predicate or postposition is determined to be included in the user's question, and a question and answer type recognition unit for classifying the user's question as the query or a keyword array type question based on the question and answer type identification result when a predicate or postposition is not included in the user's question.

2. The apparatus of claim 1, wherein when a weight value of the question and answer type does not exceed a preset threshold value, the question and answer type recognition unit classifies the user's question as the query, and when the weight value of the question and answer type exceeds the preset threshold value, the question and answer type recognition unit classifies the user's question as the keyword array type question.

3. The apparatus of claim 1, wherein the question domain distributor distributes a domain with respect to the user's question based on a law dictionary previously established for each domain or a learning model established by using learning data.

4. The apparatus of claim 3, wherein the question domain distributor includes:
a language analyzer for analyzing the language of the user's question;
a law-based domain distribution block for identifying and distributing a domain for the user's question based on the law dictionary though the language analysis result;
a learning model database for storing the learning model established by
analyzing the language with respect to the learning data and through mechanical learning of learning quality; and a learning model-based domain distribution block for distributing a domain with respect to the user's question based on the learning model when a domain is not distributed based on the law dictionary.

5. The apparatus of claim 4, wherein the learning model is established by using learning data with respect to representative questions of respective domains.

6. The apparatus of claim 1, further comprising:
a contents search filtering engine for restricting a search target document in the distributed question and answer engine based on question subject information and area information identified through the analysis of the user's question.

7. The apparatus of claim 6, wherein the contents search filtering engine includes:
a question subject filtering module for identifying a question subject based on a keyword included in the user's question and restricting a range for document searching based on the identified question subject; and
an area filtering module for identifying an interested area keyword included in the user's question and restricting the range for the document searching to an area related to the identified interested area keyword.

8. The apparatus of claim 7, wherein the question subject filtering module includes:
a language analyzer for analyzing the language of the user's question to extract a keyword;
an index keyword-based subject filtering block for identifying first subject filtering information by using a statistics method utilizing frequency information of the extracted keyword based on a predefined index keyword dictionary;
a learning model database for storing the learning model established through analyzing the language with respect to the learning data and through mechanical learning of learning quality;
a learning model-based subject filtering block for identifying second subject filtering information based on the learning model with respect to the learning quality extracted from the user's question; and
a subject filtering integrating block for integrating the first and second subject filtering information to restrict the range for the document searching with respect to the identified question subject.

9. The apparatus of claim 7, wherein the area filtering module includes:
a language analyzer for analyzing the language of the user's question to identify a named entity;
an interested area keyword identifier for selecting an interested area keyword target with respect to the identified named entity and identifying area information based on a predefined interested area keyword dictionary;
an area ambiguity elimination block for eliminating ambiguity of the identified area information by using other keywords related to the interested area keyword; and
a statistics-based representative area identification unit for restricting the range for document searching with respect to the related area based on the frequency of the interested area keyword and location information.

10. A question type and domain identifying method, the method comprising:
recognizing a number of words of a user's question to identify whether the user's question is a query for performing information searching or a question for performing a question and answer;
distributing one of plural preset domain specialized question and answer engines, as a question and answer engine of the user's question, based on the recognized word number; and
selectively performing information searching or a question and answer with respect to the user's question by using the domain specialized and question and answer engine distributed as the question and answer engine,
wherein said recognizing the number of words of a user's question includes classifying the user's question as the query for information searching when the recognized word number is one, checking whether a predicate or postposition is included in the user's question when the recognized word number is two or more, classifying the user's question as a natural language question when the predicate or postposition is included in the user's question; and classifying the user's question as the query or a keyword array type question based on the question and answer type identification result when the predicate or postposition is not included in the user's question.

11. The method of claim 10, further comprising:
classifying the user's question as the query when a weight value of the question and answer type does not exceed a preset threshold value; and
classifying the user's question as the keyword array type question when the weight value of the question and answer type exceeds the preset threshold value.

12. The method of claim 10, wherein said distributing one of plural preset domain specialized question and answer engines distributes a domain with respect to the user's question based on a law dictionary previously established for each domain or a learning model established through analyzing the language of learning data and through mechanical learning of learning quality.

13. The method of claim 12, wherein said distributing one of plural preset domain specialized question and answer engines includes:
analyzing the language of the user's question;
identifying and distributing a domain for the user's question based on the law dictionary though the language analysis result; and
distributing a domain with respect to the user's question based on the learning model when a domain is not distributed based on the law dictionary.

14. The method of claim 10, further comprising:
restricting a search target document in the distributed question and answer engine based on question subject information and area information identified through the analysis of the user's question.

15. The method of claim 14, wherein said restricting a search target document includes:
identifying a question subject based on a keyword included in the user's question and restricting a range for document searching based on the identified question subject; and
identifying an interested area keyword included in the user's question and restricting the range for the document searching to an area related to the identified interested area keyword.

16. The method of claim 15, wherein said identifying a question subject includes:
analyzing the language of the user's question to extract keywords;
identifying first subject filtering information by using a statistics method utilizing frequency information of the extracted keywords based on a predefined index keyword dictionary;

identifying second subject filtering information based on a learning model established through analyzing the language of learning data and through mechanical learning of learning quality; and integrating the first and second subject filtering information to restrict the range for the document searching with respect to the identified question subject.

17. The method of claim 15, wherein said identifying an interested area keyword includes:

analyzing the language of the user's question to identify a named entity;

selecting an interested area keyword target with respect to the identified named entity and identifying area information based on a predefined interested area keyword dictionary;

eliminating ambiguity of the identified area information by using other keywords related to the interested area keyword; and restricting the range for document searching with respect to the related area based on the frequency of the interested area keyword and location information.

18. The method of claim 17, wherein said restricting the range for document searching includes:

statistically identifying representative area information based on the frequency of the interested area keyword and location information; and restricting the range for document searching to the identified representative area information.

\* \* \* \* \*